Figure 1:
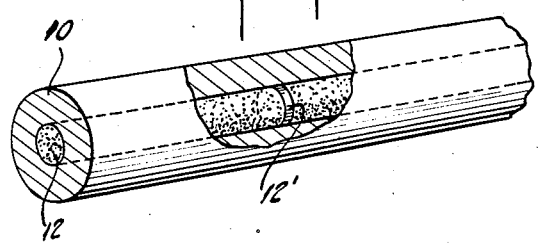

Aug. 5, 1958

S. BAGNO 2,845,700

METHOD OF SOLDERING WITH TRICRESYL
PHOSPHATE AS THE FLUX

Filed May 19, 1953

INVENTOR
SAMUEL BAGNO

BY
ATTORNEY

2,845,700

METHOD OF SOLDERING WITH TRICRESYL PHOSPHATE AS THE FLUX

Samuel Bagno, Long Island City, N. Y., assignor, by mesne assignments, to Walter Kidde & Company, Inc., Belleville, N. J., a corporation of New York Application May 19, 1953, Serial No. 355,997

1 Claim. (Cl. 29—495)

This invention relates to soldering and more specifically to a solder and soldering flux particularly adaptable for use on metals such as aluminum, magnesium, zinc alloys and the like.

One of the major problems confronting manufacturers and particularly manufacturers of electrical equipment is the development of simple and effective means for soldering aluminum and like materials. While innumerable solders and fluxes have been developed, none has been sufficiently successful for one reason or another to warrant their general adoption by industry. In the case of manufacturers of electrical products where soft solder is generally utilized for joining metal parts, wires and the like, it has been found more economical to use readily solderable metals such as copper, brass and the like and to plate other metals such as iron and steel in order to facilitate soldering.

Accordingly, it is one object of the invention to provide a flux for use with soft solder that will produce ready adhesion of the solder to metals such as aluminum, magnesium, zinc alloys and the like at normal soldering temperatures.

Another object is the provision of an improved soft solder that may be used with the flux.

Other objects and advantages of the invention will be set forth in part hereinafter and in part will be obvious herefrom, or may be learned by practice with the invention, the same being realized and attained by means of the compositions, combinations and methods pointed out in the appended claim.

The accompanying drawing referred to herein and constituting a part hereof, illustrates certain aspects of the invention and together with the description serves to explain the principles thereof.

Figure 2:
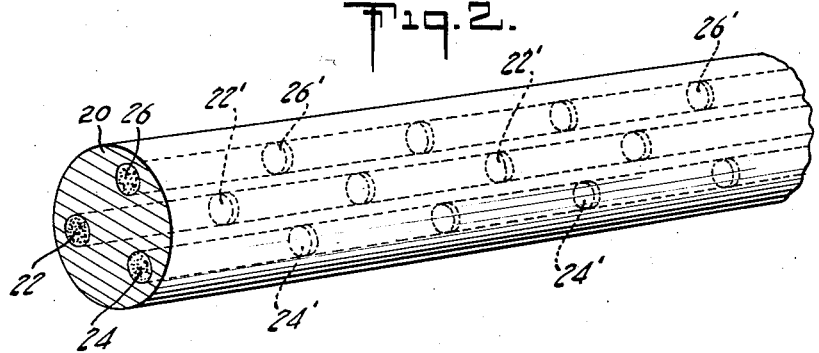

In the drawing:

Fig. 1 illustrates one embodiment of the invention; and
Fig. 2 illustrates another embodiment thereof.

It is well known that certain metals such as aluminum and the like form very fine oxides on the surface that are virtually impervious to air and consequently function to substantially prevent further oxidation of the metal. While these oxides form a protective coating for the metal, it is believed that they also operate to prevent the adhesion of other metals such as soft solders comprising alloys of lead and tin. It has been found however that good adhesion of soft solder to aluminum for instance is readily attainable under normal soldering temperatures by the use of tricresyl phosphate as a flux.

Actual experiments have indicated that aluminum, magnesium and similar difficulty solderable metals can be soldered with soft solder by applying a thin coating of tricresyl phosphate to the area to be soldered and then simultaneously heating the solder and aluminum with a tinned soldering iron in accordance with normal soldering techniques. While the chemical action resulting from the use of the phosphate as a flux is not definitely understood, it is believed that the oxides of the metal being soldered either go into solution with the phosphate or are otherwise removed and the clean surface of the metal is in effect soldered while in an oxide free state. It appears that the tricresyl phosphate maintains a relatively air tight film over the area to be soldered so that the hot solder can penetrate the film and adhere to the surface in the absence of oxygen.

Improved results can be obtained by mixing tricresyl phosphate with metal salts such as copper chloride and the like which appear to activate the phosphate and provide a much faster acting flux. A slight amount of mechanical agitation of the soldering iron against the aluminum or other metal being soldered may be required.

In certain cases it may be desirable to use a rosin flux together with the phosphate alone or in combination with the metal salt. The rosin appears to have the effect of further protecting the oxide free surface of the aluminum until adhesion with the solder is effected and is readily soluble in tricresyl phosphate of itself or when mixed with a metal salt. While the combination of rosin, phosphate and metal salt is more convenient to use in many cases, they may be applied separately. For instance the phosphate or phosphate and salt may first be applied to the metal and then the solder, such as a rosin core solder, applied in the conventional manner as by a heated soldering iron or other conventional soldering means.

This new and improved flux although particularly useful for soldering aluminum and magnesium as well as other metals with a lead-tin solder can also be used with other types of solder with equal or even greater effectiveness. It has also been found that a solder comprising a mixture of lead, tin and copper will very readily adhere to aluminum when used with the fluxes heretofore described. In certain instances it has been found that a solder containing copper will adhere very much more readily than standard lead-tin solders although both will function satisfactorily.

An important advantage of this new and improved flux aside from its ready availability and low cost, is that the joint formed by the solder and base metal will not corrode and that once the surface is tinned, conventional fluxes and methods may be used to join other tinned metal parts to it. Moreover, with this highly practical and economical flux, aluminum, magnesium and similar metals may be readily used in place of copper, brass and the like for electrical parts, with the result that lighter and in many cases more inexpensive products may be produced. In radio equipment, for instance, aluminum could be used for the heavy chassis now made of steel and specially plated to prevent rust and facilitate soldering. With the facility of soldering aluminum afforded by this invention innumerable other time, labor and cost saving substitutions may be made in all types of mechanical and electrical equipment.

As pointed out above, this new and improved flux may be applied either alone or in combination with other ingredients. In addition, it has also been found that it can be applied simultaneously with the solder in which case a structure such as that shown in Fig. 1 may be used. In this figure the solder 10 is formed with a central opening 12 housing the flux in the form of tricresyl phosphate alone or in combination with a metal salt and rosin. In order to prevent the flux within the opening 12 from draining out of the solder, the opening is provided with a series of partitions 14 which in effect transforms it into a series of successive compartments which are opened to discharge their contents as the solder 10 is melted.

A modified form is shown in Fig. 2 wherein the numeral 20 denotes a section of solder having three openings 22, 24 and 26. Each of these openings is divided into individual compartments by partitions 22', 24' and 26' as described in connection with Fig. 1. In this form of the invention the partitions in each channel 22, 24 and 26 are preferably staggered and two of the openings may contain rosin while the third phosphate alone or activated by a metal salt. If desired the solder 10 and 20 of Figs. 1 and 2 may also be formed of a copper, lead, tin alloy instead of the conventional lead, tin alloy.

While only certain embodiments of the invention have been shown and described it is apparent that other modifications and combinations may be made without departing from the true scope and spirit thereof.

I claim:

The method of soldering aluminum, magnesium and like metals comprising the steps of coating the surface to be soldered with a flux consisting essentially of tricresyl phosphate and heating soft solder to melt the same and applying it to the coated surface while heating the flux coated surface to activate the flux and cause the surfaces to be soldered together upon cooling of the solder.

References Cited in the file of this patent

UNITED STATES PATENTS

| | | |
|---|---|---|
| 1,233,803 | Overend | July 17, 1917 |
| 1,685,975 | Bender | Oct. 2, 1928 |
| 2,040,053 | Lytle | May 5, 1936 |
| 2,365,539 | Flowers | Dec. 19, 1944 |
| 2,452,995 | Cinamon | Nov. 2, 1948 |
| 2,538,495 | Barry | Jan. 16, 1951 |
| 2,565,477 | Crowell et al. | Aug. 28, 1951 |
| 2,591,994 | Alexander | Apr. 8, 1952 |
| 2,616,384 | McBride | Nov. 4, 1952 |
| 2,658,846 | De Rosa | Nov. 10, 1953 |

FOREIGN PATENTS

| | | |
|---|---|---|
| 481,303 | Great Britain | Mar. 9, 1938 |